(12) United States Patent
Labat et al.

(10) Patent No.: US 9,483,258 B1
(45) Date of Patent: Nov. 1, 2016

(54) MULTI-SITE PROVISIONING OF RESOURCES TO SOFTWARE OFFERINGS USING INFRASTRUCTURE SLICES

(75) Inventors: Jerome Labat, San Carlos, CA (US); Ramachandran Varadharajan, Fremont, CA (US); Joseph W. Armstrong, Santa Cruz, CA (US); Srinivas Nimmagadda, San Jose, CA (US)

(73) Assignee: INTUIT INC, Mountain View, CA (US)

( * ) Notice: Subject to any disclaimer, the term of this patent is extended or adjusted under 35 U.S.C. 154(b) by 104 days.

(21) Appl. No.: 13/095,621

(22) Filed: Apr. 27, 2011

(51) Int. Cl.
*G06F 9/44* (2006.01)
*G06F 9/445* (2006.01)

(52) U.S. Cl.
CPC . *G06F 8/71* (2013.01); *G06F 8/65* (2013.01); *G06F 8/61* (2013.01)

(58) Field of Classification Search
CPC .............. G06F 8/65; G06F 8/60; G06F 8/61; G06F 8/71
USPC ................................... 717/168–178; 709/226
See application file for complete search history.

(56) References Cited

U.S. PATENT DOCUMENTS

| | | | |
|---|---|---|---|
| 6,128,657 A * | 10/2000 | Okanoya et al. | 709/224 |
| 6,173,376 B1 * | 1/2001 | Fowler et al. | 711/162 |
| 2005/0108703 A1 * | 5/2005 | Hellier | 717/174 |
| 2005/0149940 A1 * | 7/2005 | Calinescu et al. | 718/104 |
| 2006/0190775 A1 * | 8/2006 | Aggarwal et al. | 714/100 |
| 2008/0275939 A1 * | 11/2008 | Martin | 709/203 |
| 2008/0313242 A1 * | 12/2008 | Doerr | 707/202 |
| 2010/0058334 A1 * | 3/2010 | Mohindra et al. | 718/1 |
| 2010/0111105 A1 * | 5/2010 | Hamilton et al. | 370/469 |
| 2010/0332629 A1 * | 12/2010 | Cotugno et al. | 709/221 |
| 2011/0231899 A1 * | 9/2011 | Pulier et al. | 726/1 |

\* cited by examiner

*Primary Examiner* — Wei Zhen
*Assistant Examiner* — Brahim Bourzik
(74) *Attorney, Agent, or Firm* — Patterson & Sheridan, LLP

(57) ABSTRACT

The disclosed embodiments provide a system that facilitates the deployment and execution of a software offering. During operation, the system obtains a set of requirements associated with a service definition of the software offering. Next, the system uses the requirements to automatically provision a set of infrastructure slices for use by the software offering without requiring manual configuration of the resources by a user, wherein each of the infrastructure slices includes a set of resources configured to support a workload associated with the software offering.

19 Claims, 5 Drawing Sheets

MULTI-SITE PROVISIONING OF RESOURCES TO SOFTWARE OFFERINGS USING INFRASTRUCTURE SLICES

RELATED APPLICATION

The subject matter of this application is related to the subject matter in a co-pending non-provisional application by inventors Jerome Labat, Ramachandran Varadharajan, Wilson W. Lau, and Thomas C. Bishop, entitled "Multidimensional Modeling of Software Offerings," having Ser. No. 13/031,950, and filed on 22 Feb. 2011.

The subject matter of this application is also related to the subject matter in a co-pending non-provisional application by inventors Jerome Labat, Ramachandran Varadharajan, Wilson W. Lau, and Thomas C. Bishop, entitled "Automatic Provisioning of Resources to Software Offerings," having Ser. No. 13/031,968, and filed on 22 Feb. 2011.

The subject matter of this application is also related to the subject matter in a co-pending non-provisional application by inventors Jerome Labat, Ramachandran Varadharajan, Sivakumar Thivakaram, and Srinivas Nimmagadda, entitled "Dynamic Reprovisioning of Resources to Software Offerings," having Ser. No. 13/034,475, and filed on 24 Feb. 2011.

BACKGROUND

Related Art

The present embodiments relate to techniques for managing software offerings. More specifically, the present embodiments relate to techniques for multi-site provisioning of resources to software offerings using infrastructure slices.

Recent computing trends have shifted the processing and consumption of data and services to cloud computing systems. Such cloud computing systems allow software providers to deploy, execute, and manage software offerings on shared infrastructure resources such as servers, network equipment, platform-virtualization software, and/or datacenter space. Furthermore, such resources may be dynamically provisioned and/or scaled, thus enabling consumption of the resources as services.

For example, a cloud computing provider may provide virtualized storage, network, and/or computing resources to multiple cloud computing customers. The cloud computing customers may deploy software offerings on the virtualized resources and pay the cloud computing provider only for resources consumed by the software offerings. As a result, the cloud computing customers may avoid capital expenditures associated with purchasing, setting up, and/or managing the underlying hardware and software. Furthermore, the centralization and sharing of infrastructure resources may improve the resources' utilization rates and management overhead.

Hence, the deployment, execution, and management of software offerings may be facilitated by mechanisms for dynamically allocating and configuring infrastructure resources used by the software offerings.

SUMMARY

The disclosed embodiments provide a system that facilitates the deployment and execution of a software offering. During operation, the system obtains a set of requirements associated with a service definition of the software offering. Next, the system uses the requirements to automatically provision a set of infrastructure slices for use by the software offering without requiring manual configuration of the resources by a user, wherein each of the infrastructure slices includes a set of resources configured to support a workload associated with the software offering.

In some embodiments, the requirements include at least one of an availability requirement and a disaster-recovery requirement.

In some embodiments, using the requirements to automatically provision the set of infrastructure slices for use by the software offering involves provisioning the infrastructure slices from a set of physical locations based on the disaster-recovery requirement.

In some embodiments, using the requirements to automatically provision the set of infrastructure slices for use by the software offering involves provisioning a subset of the infrastructure slices as redundant infrastructure slices based on the availability requirement.

In some embodiments, each of the infrastructure slices is associated with at least one of a load balancer, a software-development-lifecycle stage of the software offering, a set of security zones, an operational mode, and a physical location.

In some embodiments, the operational mode is at least one of an active mode, a passive mode, and a standby mode.

In some embodiments, the active mode is associated with a set of reserved resources, and the passive mode is associated with a set of oversubscribed resources.

In some embodiments, the standby mode corresponds to a conversion from the passive mode to the active mode.

BRIEF DESCRIPTION OF THE FIGURES

In the figures, like reference numerals refer to the same figure elements.

DETAILED DESCRIPTION

Figure 1:
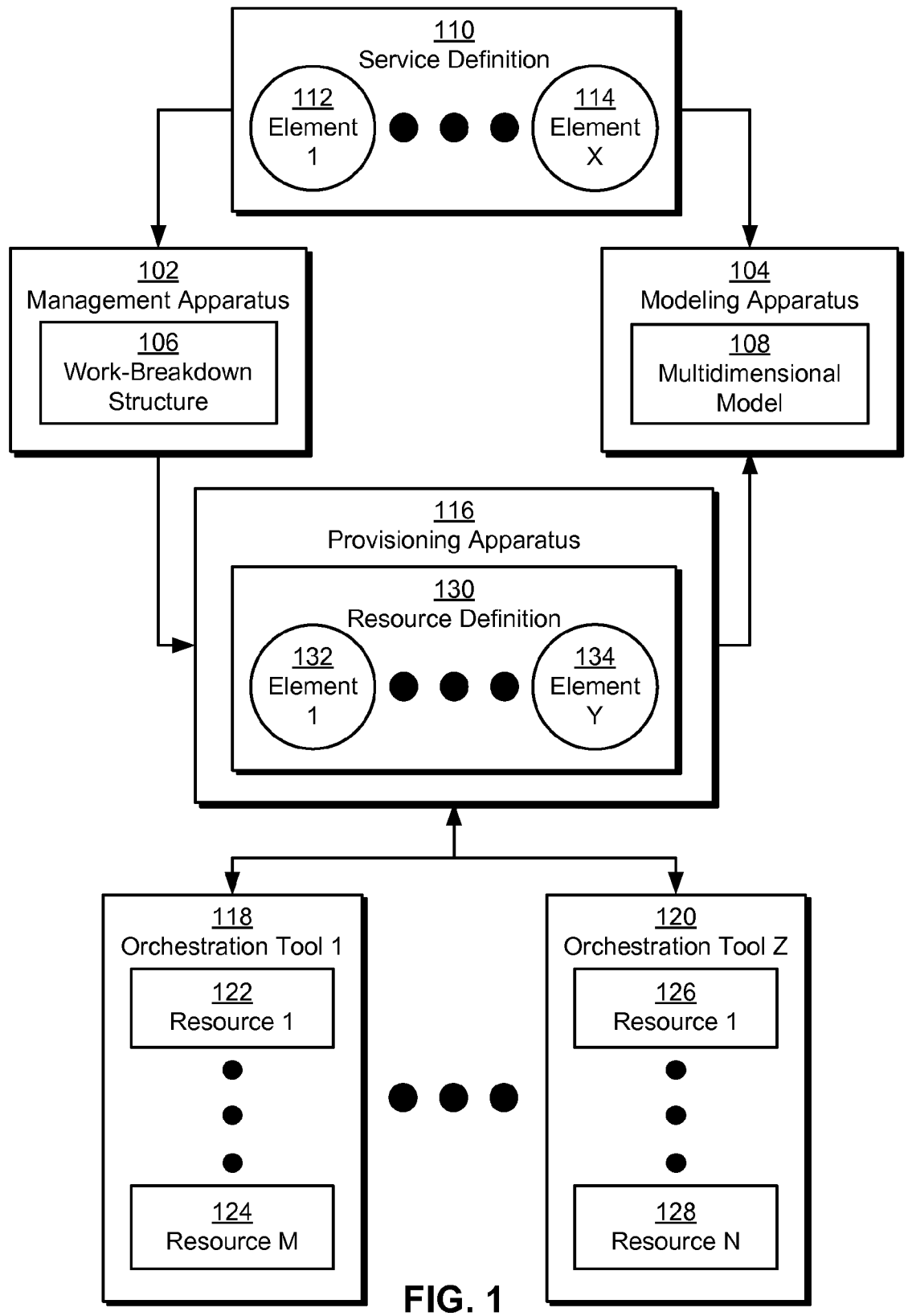
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the deployment and execution of a software offering. The software offering may correspond to an application that is deployed on one or more servers and accessed over a network connection. For example, the software offering may provide a web application, distributed application, and/or web service to users of the software offering.

More specifically, the disclosed embodiments provide a method and system for provisioning a set of resources for use by the software offering using infrastructure slices. Each infrastructure slice may contain a set of resources configured to support a workload associated with the software offering. For example, an infrastructure slice may be configured to support 10,000 concurrent users of the software offering and execute independently from other infrastructure slices used by the software offering.

To provision the resources, a set of requirements associated with a service definition of the software offering may be obtained. The requirements may include an availability requirement and/or a disaster-recovery requirement. The requirements may then be used to automatically provision the infrastructure slices for use by the software offering without requiring manual configuration of the resources by a user. For example, the availability requirement may specify an expected availability of the software offering, while the disaster-recovery requirement may specify the recovery of the software offering from a disaster. As a result, a subset of the infrastructure slices may be provisioned as redundant infrastructure slices based on the availability requirement, and the infrastructure slices may be provisioned from a set of physical locations based on the disaster-recovery requirement. Such use of infrastructure slices in provisioning resources to the software offering may facilitate fault isolation, high availability, scalability, automation, and/or disaster recovery in the software offering.

FIG. 1 shows a schematic of a system in accordance with an embodiment. As shown in FIG. 1, the system includes a management apparatus 102, a modeling apparatus 104, and a provisioning apparatus 116. Each of these components is discussed in further detail below.

In one or more embodiments, the system of FIG. 1 is used to manage the deployment and execution of a software offering on a set of resources (e.g., resource 1 122, resource m 124, resource 1 126, resource n 128). The software offering may correspond to a software program that performs tasks for a set of users. For example, the software offering may allow the users to collaborate on projects, file income taxes, manage personal or small business finances, and/or perform data mining on a target data set.

Furthermore, the software offering may be implemented using a client-server architecture. Components of the software offering may be deployed and executed on one or more servers (e.g., in a data center) and accessed from other machines using a locally installed executable, a command-line interface, and/or a web browser and network connection. In other words, the software offering may be implemented using a cloud computing system that is accessed over the Internet.

To enable execution of the software offering, users associated with the creation, deployment, and/or execution of the software offering may determine a set of requirements associated with the software offering. The users may then allocate resources (e.g., resource 1 122, resource m 124, resource 1 126, resource n 128) in the cloud computing system to components in the software offering and configure the allocated resources in a way that allows the executing software offering to meet the requirements. For example, a development team for the software offering may provide a policy specifying a level of availability, reliability, scalability, security, and/or response time in the software offering. Administrators for the cloud computing system may ensure compliance with the policy by allocating sufficient infrastructure resources to the software offering and/or configuring the resources to provide requisite levels of redundancy, security, and/or load balancing in the software offering.

Those skilled in the art will appreciate that the cloud computing system may use virtualization to deploy and execute the software offering on a set of shared resources. In particular, a number of orchestration tools (e.g., orchestration tool 1 118, orchestration tool z 120) may be used to virtualize and/or provision different types of resources in the cloud computing system. For example, a virtual machine monitor may allocate and/or manage computing resources by creating and executing virtual machines as abstractions of physical servers. Similarly, a virtual filer may combine storage resources from a variety of storage devices into a resource pool and allocate logical volumes of storage from the resource pool. Finally, network routers and/or switches may partition network resources into virtual local area networks (VLANs) that connect physical and/or virtual computing and/or storage resources in the cloud computing system.

Moreover, each orchestration tool may include functionality to dynamically reprovision resources in response to changes in the software offering and/or in demand for the resources. For example, a virtual machine monitor may instantiate a new virtual machine to enable the addition of a new web server to the software offering. The virtual machine monitor may also allocate a set of physical computing resources (e.g., processor, memory, etc.) to the virtual machine to enable execution of the web server on the resources. Finally, the virtual machine monitor may move the virtual machine to a different set of physical resources if the web server's resource requirements change and/or the physical resources (e.g., servers) used to execute the web server become overloaded.

In other words, the use of resources by the software offering may be managed by a number of disparate, independently acting orchestration tools. As a result, the cloud computing system may lack a comprehensive view of dependencies between software components in the software offering and the hardware resources used to execute the software components. For example, the cloud computing system may lose track of resources allocated to the software offering once the orchestration tools begin reallocating and/or reprovisioning the resources.

Such lack of dependency information may cause problems with tracking and managing events and/or failures in the cloud computing system. For example, a server outage in the cloud computing system may require manual intervention by administrators to determine the set of hardware and software components affected by the outage and/or perform corrective actions that enable recovery from the server outage.

In one or more embodiments, the system of FIG. 1 reduces complexity associated with managing requirements and dependencies in the software offering by creating a multidimensional model 108 of the software offering and using multidimensional model 108 to manage the deployment and execution of the software offering. As shown in FIG. 1, multidimensional model 108 may be created from a service definition 110 of the software offering and a resource definition 130 of resources available for use by the software offering.

Service definition 110 may be obtained from a user (e.g., developer, architect, etc.) associated with the creation and/or development of the software offering. More specifically, service definition 110 may correspond to a logical representation of the software offering in terms of the software offering's configuration, topology, policies, and/or QoS attributes. As a result, elements (e.g., element 1 112, element x 114) of service definition 110 may include one or more tiers, a set of service components, and/or a set of connections. For example, an architect of the software offering may provide service definition 110 by inputting the number of tiers, level of security, software-development-lifecycle stage, and/or software stack associated with the software offering into a user interface provided by management apparatus 102.

On the other hand, resource definition 130 may be obtained from administrators and/or orchestration tools of the cloud computing system and correspond to a logical representation and/or division of available infrastructure resources in the cloud computing system in terms of the resources' locations, states, and/or utilization. Elements (e.g., element 1 132, element y 134) of resource definition 130 may thus represent physical and/or virtual resources, resource clusters, security zones, hosting segments, and/or locations in the cloud computing system. For example, an administrator may manually populate resource definition 130 with an inventory of physical and/or virtual resources in the cloud computing system, or provisioning apparatus 116 may receive notifications of changes to resources (e.g., addition of new resources, removal of existing resources) in the cloud computing system from the orchestration tools (e.g., virtual machine monitors, virtual filers) and update resource definition 130 accordingly.

To create multidimensional model 108, modeling apparatus 104 may map a first set of elements (e.g., element 1 112, element x 114) from service definition 110 to a second set of elements (e.g., element 1 132, element y 134) from resource definition 130. The mappings may represent dependencies of the first set of elements on the second set of elements. For example, a mapping from a service component in service definition 110 to a resource in resource definition 130 may indicate the allocation of the resource to the service component by an orchestration tool. Creation of multidimensional models for software offerings is discussed in a co-pending non-provisional application by inventors Jerome Labat, Ramachandran Varadharajan, Wilson W. Lau, and Thomas C. Bishop, entitled "Multidimensional Modeling of Software Offerings," having Ser. No. 13/031,950, and filed on 22 Feb. 2011, which is incorporated herein by reference.

In one or more embodiments, the creation of multidimensional model 108 involves the identification of a set of requirements associated with the software offering from service definition 110, as well as the subsequent allocation of a subset of the resources from resource definition 130 to service components in service definition 110 based on the requirements. In particular, management apparatus 102 may determine the software offering's requirements from a set of policies in service definition 110 and store the requirements in a work-breakdown structure 106. The policies may include a software-development-lifecycle policy, a security policy, a software-template policy, a QoS policy, and/or a structural policy. The requirements may thus specify the amount and/or configuration of resources required to satisfy the policies.

Next, provisioning apparatus 116 may use work-breakdown structure 106 to automatically provision a set of resources for use by the software offering without requiring manual configuration of the resources by a user (e.g., administrator). For example, provisioning apparatus 116 may use work-breakdown structure 106 to create a set of service containers for hosting the software offering. Provisioning apparatus 116 may then allocate resources to the service containers by requesting the required amounts and/or configurations of resources from the corresponding orchestration tools. Automatic provisioning of resources to software offerings is discussed in a co-pending non-provisional application by inventors Jerome Labat, Ramachandran Varadharajan, Wilson W. Lau, and Thomas C. Bishop, entitled "Automatic Provisioning of Resources to Software Offerings," having Ser. No. 13/031,968, and filed on 22 Feb. 2011, which is incorporated herein by reference.

In one or more embodiments, the system of FIG. 1 facilitates high availability, scalability, fault isolation, automation, and/or disaster recovery in the software offering by provisioning resources to the software offering using infrastructure slices. Each infrastructure slice may include a set of self-contained resources configured to support a workload associated with the software offering. For example, individual infrastructure slices may include sufficient resources (e.g., computing resources, network resources, storage resources) to support 10,000 concurrent users of the software offering and execute independently from other infrastructure slices used by the software offering.

To enable independent execution of the infrastructure slices, a different instance of the software offering may be deployed and executed in each infrastructure slice. For example, each infrastructure slice may contain a separate set of web servers, application servers, and/or databases used to execute the software offering. Furthermore, network traffic may not be shared among the infrastructure slices to effectively isolate the infrastructure slices from one another. As a result, a failure and/or an outage in one infrastructure slice may only affect the workload (e.g., users) associated with the infrastructure slice and not the workloads of other infrastructure slices.

Such use of predefined infrastructure slices in the provisioning of resources may allow the software offering to meet an availability and/or disaster-recovery requirement associated with service definition 110. In particular, an availability requirement for the software offering may be met by provisioning redundant infrastructure slices to the software offering (e.g., as backups of actively used infrastructure slices). Similarly, a disaster-recovery requirement for the software offering may be met by provisioning infrastructure slices from multiple physical locations (e.g., data centers) so that the software offering may be recovered in the event of a disaster in physical location. Provisioning of resources to software offerings using infrastructure slices is discussed in further detail below with respect to FIG. 2.

As mentioned previously, multidimensional model 108 may include dependencies between service components in service definition 110 and resources in resource definition 130. Consequently, modeling apparatus 104 may create multidimensional model 108 by mapping resources allocated by provisioning apparatus 116 to the service components to which the resources were allocated.

Modeling apparatus 104 may also update the mappings based on changes to the provisioned resources. For example, resources provisioned to service components may change as the orchestration tools allocate new resources, deallocate currently allocated resources, and/or use different sets of physical resources to execute virtualized resources (e.g., virtual machines, logical volumes, VLANs, etc.). Such changes may be obtained by provisioning apparatus 116 through querying and/or monitoring of the orchestration tools. The changes may also be used by provisioning apparatus 116 to update resource definition 130. The updates may then be propagated to multidimensional model 108 via modeling apparatus 104.

Because multidimensional model 108 contains an up-to-date representation of service components, resources, and dependencies in the software offering, the system of FIG. 1 may facilitate management of the software offering within the cloud computing system. For example, multidimensional model 108 may facilitate the automatic deployment of the software offering on the allocated resources, identification of resources allocated to the software offering, identification of failures during execution of the software offering, and/or management of changes associated with the software offering or the resources. In other words, the creation and update of multidimensional model 108 may reduce complexity and/or overhead associated with configuration management, fault diagnosis and remediation, deployment, and/or resource provisioning in the software offering.

Figure 2:
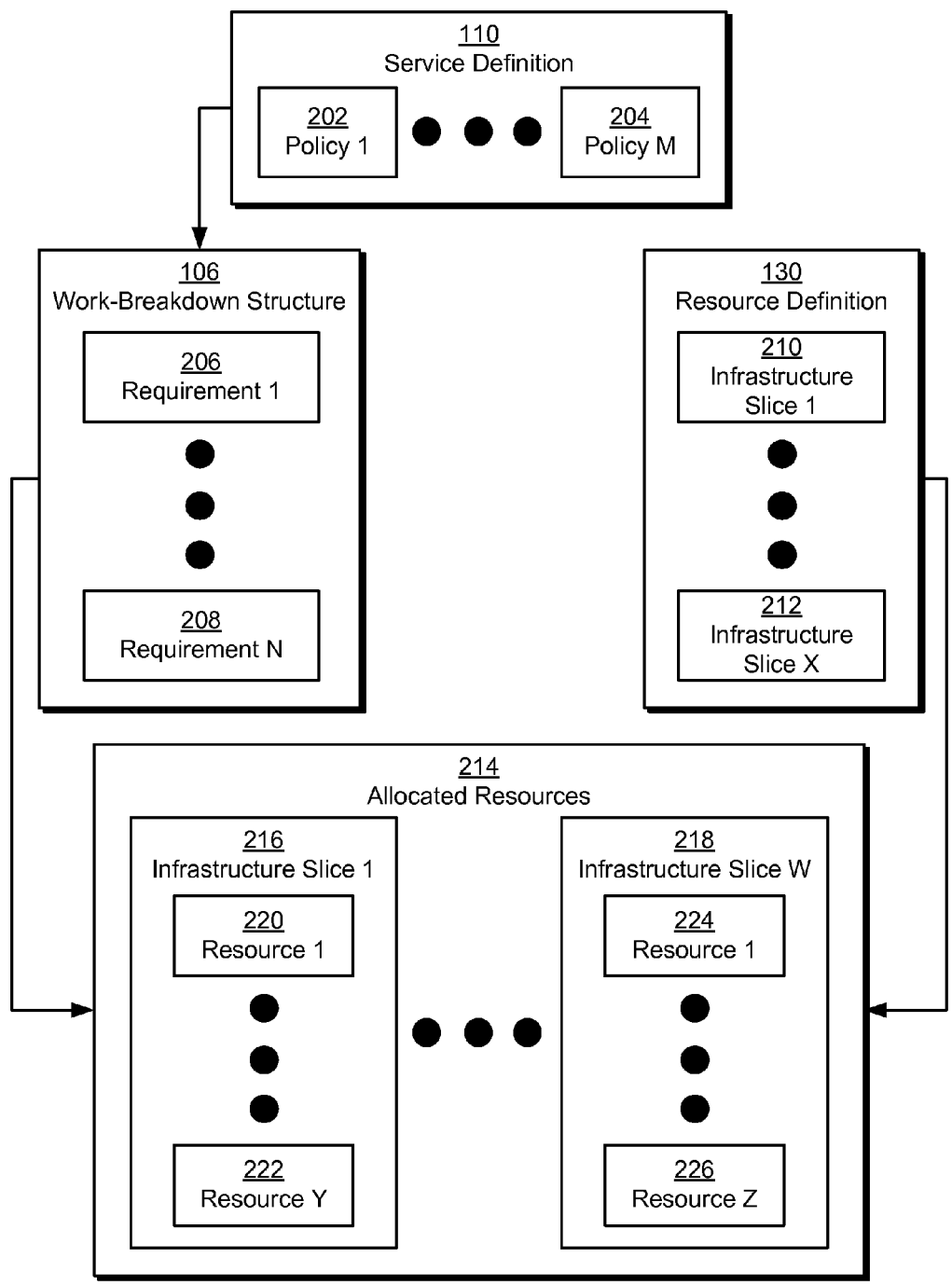
FIG. 2 shows the provisioning of resources to a software offering in accordance with an embodiment.

FIG. 2 shows the provisioning of resources to a software offering in accordance with an embodiment. As discussed in the above-referenced applications, work-breakdown structure 106 may be created and used to allocate resources to the software offering from a set of available resources from resource definition 130. In particular, work-breakdown structure 106 may include a set of requirements (e.g., requirement 1 206, requirement n 208) associated with a set of policies (e.g., policy 1 202, policy m 204) in service definition 110, such as a software-development-lifecycle policy, a structural policy, a security policy, a software-template policy, and/or a QoS policy.

The requirements may then be used to automatically provision a set of resources (e.g., allocated resources 214) for use by the software offering. For example, requirements associated with the security policy may specify different levels of security for different service components. To meet such security requirements, resources may be provisioned from multiple (e.g., public, non-secure, secure) security zones to allow each service component to deploy and execute with the appropriate level of security.

In one or more embodiments, the requirements include an availability requirement and a disaster-recovery requirement. The availability requirement may specify a minimum and/or expected availability of the software offering. For example, the availability requirement may specify an expected availability of "five nines" (e.g., 99.999%) for a high-availability software offering. The disaster-recovery requirement may identify a set of mechanisms (e.g., hardware, software, data, etc.) for enabling the recovery of the software offering from a disaster. For example, the disaster-recovery requirement may indicate the provisioning of resources from different physical locations to enable backups of both data and services associated with the software offering and/or the recovery of the software offering from a disaster in one of the locations.

To facilitate the software offering's compliance with the availability and/or disaster-recovery requirements, resources may be provisioned to the software offering using infrastructure slices (e.g., infrastructure slice 1 210, infrastructure slice x 212). To provision infrastructure slices for use by the software offering, the requirements in work-breakdown structure 106 may be compared with a set of available infrastructure slices (e.g., infrastructure slice 1 210, infrastructure slice x 212) in resource definition 130 to determine if the available infrastructure slices are sufficient to meet the requirements. If the software offering cannot be provisioned adequately using the available infrastructure slices, the software offering is not provisioned from the available infrastructure slices.

If the software offering can be sufficiently provisioned from the available infrastructure slices, a set of infrastructure slices (e.g., infrastructure slice 1 216, infrastructure slice w 218) is allocated to the software offering based on work-breakdown structure 106. As shown in FIG. 2, each allocated infrastructure slice may contain a set of resources (e.g., resource 1 220, resource y 222, resource 1 224, resource z 226) configured to support a workload in the software offering.

In one or more embodiments, each infrastructure slice includes sufficient computing, storage, and/or network resources to support a pre-specified number of concurrent users (e.g., 10,000) of the software offering. Conversely, each infrastructure slice may be "sized" to support a different workload. For example, infrastructure slices may include resources to support 5,000, 10,000, or 20,000 concurrent users to enable finer-grained provisioning of resources to various software offerings based on the software offerings' expected capacities.

In other words, an infrastructure slice may represent a standalone "unit" containing an isolated set of resources on which the software offering may execute. For example, each infrastructure slice may provide an implementation of the software offering independently of other infrastructure slices used by the software offering. To isolate the infrastructure slices from one another, network traffic may not be shared among the infrastructure slices, and interaction among infrastructure slices and other resources used by the software offering may only occur during access to shared services by the infrastructure slices. As a result, a failure and/or outage in one infrastructure slice may only impact the users associated with the workload of the infrastructure slice. Other users may continue using the software offering as long as the infrastructure slice(s) through which the other users access the software offering are operating normally. Infrastructure slices are discussed in further detail below with respect to FIG. 3.

In one or more embodiments, the infrastructure slices are provisioned from a set of physical locations based on the disaster-recovery requirement. For example, the infrastructure slices may be provisioned from two or more data centers to facilitate recovery of the software offering from a disaster in one data center. Similarly, a subset of the infrastructure slices may be provisioned as redundant infrastructure slices based on the availability requirement. For example, the availability of the software offering may be increased by provisioning 10 infrastructure slices for "active" use in processing workloads and 10 redundant infrastructure slices that serve as backups of the actively used infrastructure slices.

More specifically, each infrastructure slice may be associated with an operating mode corresponding to an active mode, a passive mode, and/or a standby mode. An infrastructure slice may be placed in an active mode to enable use of the infrastructure slice in processing a workload for the software offering. In other words, an active-mode infrastructure slice may represent normal execution of the software offering on resources within the infrastructure slice. As a result, the active mode may be associated with a set of reserved resources on which the infrastructure slice may execute to process the workload. For example, an active-mode infrastructure slice may contain dedicated physical and/or virtualized resources in multiple security zones within a data center to enable the creation and/or execution of multiple tiers (e.g., presentation, application, data) with different security requirements in the infrastructure slice.

On the other hand, an infrastructure slice may be in a passive mode if the infrastructure slice is redundantly provisioned to the software offering. Because a passive-mode infrastructure slice is not actively used in the processing of workloads for the software offering, the passive mode may be associated with a set of oversubscribed resources. In other words, a set of resources may be allocated to multiple passive-mode infrastructure slices to reduce the amount of resources occupied by non-actively-executing infrastructure slices. On the other hand, increased availability and/or disaster recovery in the software offering may still be achieved with such oversubscribing of resources, because most failures are localized (e.g., within a rack or data center) and thus unlikely to require the restoration of all active-mode infrastructure slices allocated to the software offering at the same time.

For example, the software offering may execute on five active-mode infrastructure slices from one data center and five active-mode infrastructure slices from a second data center. To facilitate high availability in the software offering, 10 passive-mode infrastructure slices from a third data center may be allocated to the software offering as backups of the 10 active-mode infrastructure slices. Moreover, sets of resources in the third data center may be oversubscribed to pairs of passive-mode infrastructure slices, with each pair providing a backup of one active-mode infrastructure slice from the first data center and a backup of one active-mode infrastructure slice from the second data center. Consequently, the 10 passive-mode infrastructure slices may occupy the resources of only five infrastructure slices in the third data center while still allowing all of the active-mode infrastructure slices in one data center to be restored in the event of an outage and/or disaster in the data center.

Finally, the standby mode may correspond to a conversion from the passive mode to the active mode. For example, a passive-mode infrastructure slice may be placed in standby mode if an active-mode infrastructure slice of which the passive-mode infrastructure slice is a backup is experiencing an outage and/or failure. During standby mode, resources may be reserved for use by the infrastructure slice and/or configured for deployment and/or execution of the software offering on the infrastructure slice.

In one or more embodiments, orchestration tools (e.g., orchestration tool 1 118, orchestration tool z 120 of FIG. 1) for the software offering are used to mediate the creation, provisioning, and use of the infrastructure slices. As discussed above, the orchestration tools may be used to virtualize and/or provision resources for use by the software offering. In turn, the orchestration tools may be used to reserve resources for use by active-mode infrastructure slices, oversubscribe resources to passive-mode infrastructure slices, and/or configure resources for active use in standby-mode infrastructure slices. Information from the orchestration tools may then be used to update resource definition 130 and/or the multidimensional model (e.g., multidimensional model 108 of FIG. 1) of the software offering to facilitate fault detection and recovery, automatic deployment of the software offering on the infrastructure slices, and/or management of changes associated with the software offering and/or infrastructure slices.

For example, an active-mode infrastructure slice may be created by reserving physical and/or virtualized resources for the infrastructure slice through the orchestration tools, deploying the software offering on the resources, and updating resource definition 130 to include the active-mode infrastructure slice and the reserved resources for the active-mode infrastructure slice. Similarly, a set of resources may be oversubscribed to multiple passive-mode infrastructure slices by obtaining the resources using the orchestration tools and referencing the resources from a set of nodes corresponding to the passive-mode infrastructure slices in resource definition 130. Finally, a standby-mode infrastructure slice may be configured for active workload-processing by reserving a set of resources associated with (e.g., oversubscribed to) the infrastructure slice through the orchestration tools, copying data associated with the execution of the software offering to the infrastructure slice, and/or setting up environments used by the software offering on the reserved resources.

The use of infrastructure slices in provisioning resources to the software offering may thus improve availability, scalability, disaster recovery, automation, and/or fault isolation in the software offering. In particular, the ability to easily create and/or replicate infrastructure slices may facilitate efficient scaling of the software offering, enable automated deployment of the software offering on the infrastructure slices, and/or reduce downtime (e.g., increase availability) in the software offering. Furthermore, the lack of dependencies among infrastructure slices may facilitate fault isolation by limiting the effects of a failure or outage in an infrastructure slice to only the users associated with the workload of the infrastructure slice. Finally, the provisioning of infrastructure slices from multiple physical locations may allow the software offering to continue executing and/or recover in the event of a disaster in one physical location.

Figure 3:
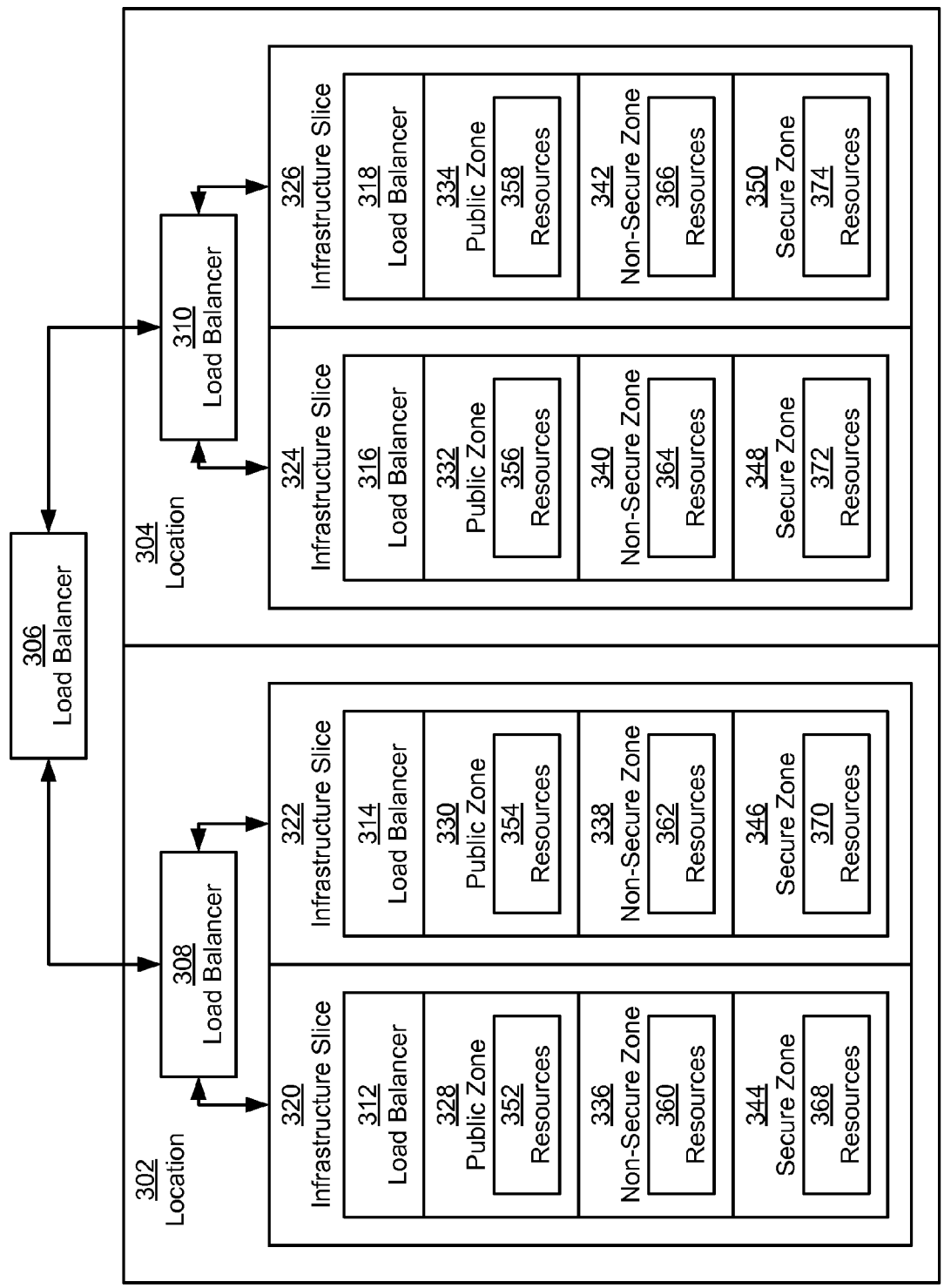
FIG. 3 shows the use of infrastructure slices in provisioning resources from multiple physical locations in accordance with an embodiment.

FIG. 3 shows the use of infrastructure slices 320-326 in provisioning resources from multiple physical locations 302-304 in accordance with an embodiment. Each location 302-304 may correspond to a data center and/or other location-based collection of cloud-computing resources 352-374. Furthermore, resources 352-374 in each location 302-304 may be divided among multiple infrastructure slices 320-326.

As described above, infrastructure slices 320-326 may correspond to a self-contained set of resources on which a software offering may execute. For example, resources for each infrastructure slice 320-326 may reside on the same physical rack within a data center. A lack of dependencies (e.g., network traffic, resources, data, etc.) among infrastructure slices 320-326 may additionally allow infrastructure slices 320-326 to execute independently from one another. In other words, infrastructure slices 320-326 may be configured to process non-overlapping workloads associated with the software offering. For example, a workload associated with 100,000 concurrent users of the software offering may be processed by dividing the workload among 10 infrastructure slices such that each infrastructure slice is assigned a workload associated with 10,000 concurrent users and no user appears in the workload of more than one infrastructure slice.

To facilitate independent workload processing by infrastructure slices 320-326 and/or high availability in the software offering, a set of load balancers 306-318 may direct network traffic to infrastructure slices 320-326. First, load balancer 306 may correspond to a global load balancer that distributes network traffic across multiple locations 302-304. For example, load balancer 306 may direct network traffic from each user of the software offering to a data center with the highest performance and/or proximity to the user.

Next, load balancers 308-310 may direct network traffic at a given location 302-304 to the relevant infrastructure slice 320-326 within the location. For example, load balancer 308 may route network traffic to either infrastructure slice 320 or infrastructure slice 322 based on the existing workloads and/or performances of both infrastructure slices 320-322.

Once network traffic arrives at an infrastructure slice 320-326, a load balancer 312-318 in the infrastructure slice may provide application-level high availability by directing the network traffic to the least loaded resources 352-374 (e.g., servers, virtual machines, etc.). For example, load balancer 312 may direct transactions for a user to the least loaded web server, application server, and/or database in infrastructure slice 320.

In one or more embodiments, each infrastructure slice 320-326 is associated with a software-development-lifecycle stage of the software offering. For example, infrastructure slices 320 and 324 may contain service components from a pre-production stage of the software offering, while infrastructure slices 322 and 326 may contain service components from a production stage of the software offering. Because different software-development-lifecycle stages of the software offering may be deployed and executed on configurable and/or replicable infrastructure slices 320-326 within the same physical environment, infrastructure slices 320-326 may facilitate the configuration and allocation of resources for one stage based on data collected during the deployment and execution of the previous stage.

As shown in FIG. 3, each infrastructure slice 320-326 contains a set of security zones: a public zone 328-334, a non-secure zone 336-342, and a secure zone 344-350. In addition, each security zone includes a set of resources 352-374 to enable the deployment and execution of service components for the software offering within the security zone. For example, public zones 328-334 may include resources 352-358 for web servers, non-secure zones 336-342 may include resources 360-366 for application servers, and secure zones 344-350 may include resources 368-374 for databases. Such use of security zones within each infrastructure slice 320-326 may thus enable the deployment and execution of the software offering within the infrastructure slice according to the policies and/or requirements associated with the software offering's service definition (e.g., service definition 110 of FIG. 1).

Furthermore, infrastructure slices 320-326 may be provisioned to the software offering based on one or more requirements associated with the service definition. In particular, a set of active-mode infrastructure slices may be provisioned to the software offering based on a capacity requirement for the software offering. In addition, a subset of the infrastructure slices may be provisioned as redundant infrastructure slices based on an availability requirement for the software offering. Finally, the infrastructure slices may be provisioned from multiple physical locations 302-304 based on a disaster-recovery requirement for the software offering.

For example, the software offering may include a capacity requirement of 80,000 concurrent users, an availability requirement of five nines, and a disaster-recovery requirement specifying the execution of the software offering from at least two different physical locations. To meet the requirements, eight active-mode infrastructure slices configured to support 10,000 concurrent users each may be allocated to the software offering as four infrastructure slices from location 302 and four infrastructure slices from location 304. In addition, eight passive-mode infrastructure slices may also be allocated to the software offering as four infrastructure slices from each location 302-304. The passive-mode infrastructure slices from each location may then be configured as backups of active-mode infrastructure slices in the other location. As a result, an outage in location 302 may be handled by copying data associated with the active-mode infrastructure slices in location 302 to the passive-mode backup infrastructure slices in location 304, transitioning the backup infrastructure slices to standby mode for resource configuration and/or deployment of the software offering, and restoring the execution of the software offering on the backup infrastructure slices in active mode.

Infrastructure slices 320-326 may additionally facilitate dynamic reprovisioning of resources to the software offering in response to changes in the software offering's requirements. For example, the allocation of active-mode infrastructure slices to the software offering may be increased in response to an increase in the expected capacity of the software offering. Along the same lines, the allocation of passive-mode (e.g., redundant) infrastructure slices to the software offering may be varied to increase or decrease the expected availability of the software offering. Lastly, infrastructure slices may be provisioned from different physical locations based on requirements associated with recovery from a disaster by the software offering. Dynamic reprovisioning of resources to software offerings is discussed in a co-pending non-provisional application by inventors Jerome Labat, Ramachandran Varadharajan, Sivakumar Thivakaram, and Srinivas Nimmagadda, entitled "Dynamic Reprovisioning of Resources to Software Offerings," having Ser. No. 13/034,475, and filed on 24 Feb. 2011, which is incorporated herein by reference.

Figure 4:
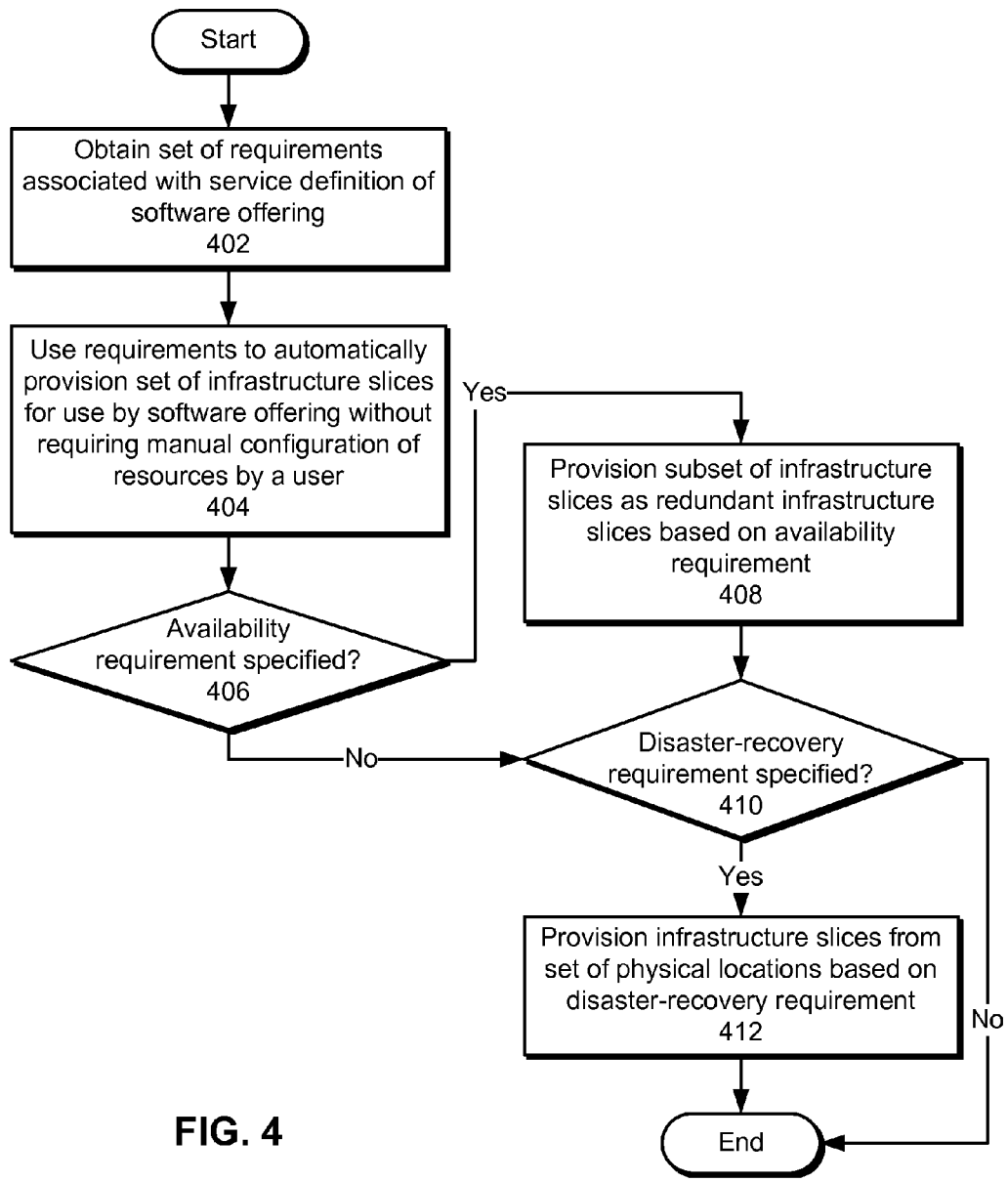
FIG. 4 shows a flowchart illustrating the process of facilitating the deployment and execution of a software offering in accordance with an embodiment.

FIG. 4 shows a flowchart illustrating the process of facilitating the deployment and execution of a software offering in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

First, a set of requirements associated with a service definition of the software offering is obtained (operation 402). The requirements may specify the amount and/or configuration of resources to be used by the software offering. Next, the requirements are used to automatically provision a set of infrastructure slices for use by the software offering without requiring manual configuration of the resources by a user (operation 404). Each infrastructure slice may contain a set of resources configured to support a workload associated with the software offering. In addition, each infrastructure slice may be associated with a load balancer, a software-development-lifecycle stage of the software offering, a set of security zones, an operational mode, and/or a physical location.

More specifically, the requirements may specify an availability requirement (operation 406). If the availability requirement is specified, a subset of the infrastructure slices is provisioned as redundant infrastructure slices based on the availability requirement (operation 408). For example, a requirement for high availability in the software offering may be met by provisioning 10 infrastructure slices to the software offering for active use in processing workloads and 10 infrastructure slices to the software offering as redundant backups of the actively used infrastructure slices. On the other hand, infrastructure slices may not be provisioned redundantly if no availability requirement is specified.

The requirements may also specify a disaster-recovery requirement (operation 410). If the disaster-recovery requirement is specified, the infrastructure slices are provisioned from a set of physical locations based on the disaster-recovery requirement (operation 412). For example, infrastructure slices from three different data centers may be provisioned to the software offering to allow the software offering to recover from a disaster in one data center using the infrastructure slices in the other two data centers. Conversely, the lack of a disaster-recovery requirement in the requirements may result in the provisioning of infrastructure slices from the same physical location and/or from physical locations with available (e.g., unused) infrastructure slices.

Figure 5:
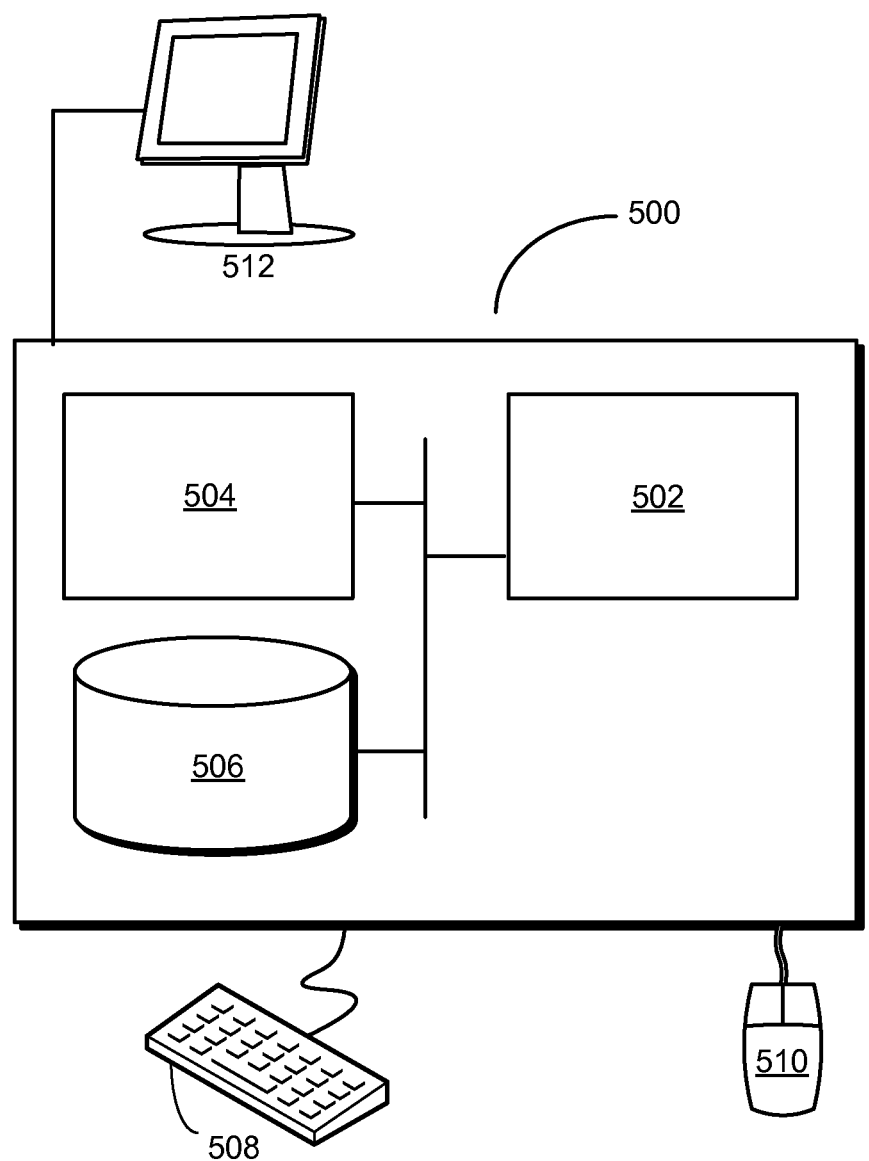
FIG. 5 shows a computer system in accordance with an embodiment.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the deployment and execution of a software offering. The system may include a management apparatus that obtains a set of requirements associated with a service definition of the software offering. The system may also include a provisioning apparatus that uses the requirements to automatically provision a set of infrastructure slices for use by the software offering without requiring manual configuration of the resources by a user.

In addition, one or more components of computer system 500 may be remotely located and connected to the other components over a network. Portions of the present embodiments (e.g., management apparatus, provisioning apparatus, etc.) may also be located on different nodes of a distributed system that implements the embodiments. For example, the present embodiments may be implemented using a cloud computing system that manages the deployment, execution, and maintenance of a software offering.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for deploying a software offering, comprising:
identifying a set of requirements specified by a service definition of the software offering,
wherein the service definition specifies an availability requirement, a disaster recovery requirement, and a capacity requirement for deploying the software offering on one or more cloud computing service platforms;
identifying a resource definition associated with each of the one or more cloud computing service platforms, wherein each resource definition specifies locations and availability for at least one of compute, network, and storage services available from the cloud computing service platform;
determining a configuration for an infrastructure slice used to host an instance of the service offering, wherein the configuration specifies computing, storage, and network resources sufficient for the infrastructure slice to support a pre-defined number of concurrent users of the software offering;
automatically provisioning a plurality of infrastructure slices each having the determined configuration without requiring manual configuration of resources by a user in order to satisfy the availability requirement, the disaster recovery requirement, and the capacity requirement,
wherein each infrastructure slice comprises one or more self-contained resources and do not share network traffic with other infrastructure slices from the one-or-more infrastructure slices in order to host an instance of the software offering independently from other instances of the software offering;
automatically re-provisioning the one-or-more infrastructure slices based on changes to the set of requirements specified by the service definition or changes to the resource definition associated with one of the cloud computing service platforms without the assistance of the user;
wherein the one-or-more infrastructure slices comprises a set of active slices that are used for processing workloads and at least one passive slice that is redundantly provisioned to the software offering, wherein the set of active slices comprises resources from at least two different data centers, wherein the at least one passive slice comprises resources from a third data center that is separate from the at least two different data centers, wherein the passive slice is oversubscribed to at least two of the active slices so that the passive slice provides redundancy for all slices in the at least two of the active slices, and wherein the at least two of the active slices comprises slices from two or more of the at least two different data centers.

2. The computer-implemented method of claim 1, wherein automatically provisioning the plurality of infrastructure slices involves:
Provisioning at least a first infrastructure slice based on the location specified in the resource definition of one of the cloud computing service platforms to satisfy the disaster-recovery requirement.

3. The computer-implemented method of claim 1, wherein automatically provisioning the plurality of infrastructure slices involves:
provisioning a subset of the plurality of infrastructure slices as redundant infrastructure slices to satisfy the availability requirement.

4. The computer-implemented method of claim 1, wherein each of the infrastructure slices is associated with at least one of:
a load balancer;
a software-development-lifecycle stage of the software offering;
an operational mode; and
a physical location.

5. The computer-implemented method of claim 4, wherein the operational mode is at least one of an active mode, a passive mode, and a standby mode.

6. The computer-implemented method of claim 5, wherein the active mode is associated with a set of reserved resources, and wherein the passive mode is associated with a set of oversubscribed resources.

7. The computer-implemented method of claim 6, wherein the standby mode corresponds to a conversion from the passive mode to the active mode.

8. A system for deploying a software offering, comprising:
a processor coupled to a memory and configured to:
identify a set of requirements specified by a service definition of the software offering,
wherein the service definition specifies an availability requirement, a disaster recovery requirement, and a capacity requirement for deploying the software offering on one or more cloud computing service platforms,
identify a resource definition associated with each of the one or more cloud computing service platforms,
wherein each resource definition specifies locations and availability for at least one of compute, network, and storage services available from the cloud computing service platform, and
determine a configuration for an infrastructure slice used to host an instance of the service offering, wherein the configuration specifies computing, storage, and network resources sufficient for the infrastructure slice to support a pre-defined number of concurrent users of the software offering;
automatically provisioning a plurality of infrastructure slices each having the determined configuration without requiring manual configuration of resources by a user in order to satisfy the availability requirement, the disaster recovery requirement, and the capacity requirement,
wherein each infrastructure slice comprises one or more self-contained resources and do not share network traffic with other infrastructure slices from the one-or-more infrastructure slices in order to host an instance of the software offering independently from other instances of the software offering;
automatically re-provision the one-or-more infrastructure slices based on changes to the set of requirements specified by the service definition or changes to the resource definition associated with one of the cloud computing service platforms without the assistance of the user;
wherein the one-or-more infrastructure slices comprises a set of active slices that are used for processing workloads and at least one passive slice that is redundantly provisioned to the software offering, wherein the set of active slices comprises resources from at least two different data centers, wherein the at least one passive slice comprises resources from a third data center that is separate from the at least two different data centers, wherein the passive slice is oversubscribed to at least two of the active slices so that the passive slice provides redundancy for all slices in the at least two of the active slices, and wherein the at least two of the active slices comprises slices from two or more of the at least two different data centers.

9. The system of claim 8, wherein automatically provisioning, the plurality of infrastructure slices involves:
provisioning at least a first infrastructure slice based on the location specified in the resource definition of one of the cloud computing service platforms to satisfy the disaster-recovery requirement.

10. The system of claim 8, wherein automatically provisioning the plurality of infrastructure slices involves:
provisioning a subset of the plurality of infrastructure slices as redundant infrastructure slices to satisfy the availability requirement.

11. The system of claim 8, wherein each of the infrastructure slices is associated with at least one of:
a load balancer;
a software-development-lifecycle stage of the software offering;
an operational mode; and
a physical location.

12. The system of claim 11, wherein the operational mode is at least one of an active mode, a passive mode, and a standby mode.

13. The system of claim 12, wherein the active mode is associated with a set of reserved resources, and
wherein the passive mode is associated with a set of oversubscribed resources.

14. The system of claim 13, wherein the standby mode corresponds to a conversion from the passive mode to the active mode.

15. A non-transitory computer-readable storage medium storing instructions that when executed by a computer cause the computer to perform a method for deploying a software offering, the method comprising:
identifying a set of requirements specified by a service definition of the software offering,
wherein the service definition specifies an availability requirement, a disaster recovery requirement, and a capacity requirement for deploying the software offering on one or more cloud computing service platforms;
identifying a resource definition associated with each of the one or more cloud computing service platforms,
wherein each resource definition specifies locations and availability for at least one of compute, network, and storage services available from the cloud computing service platform;
determining a configuration for an infrastructure slice used to host an instance of the service offering, wherein the configuration specifies computing, storage, and network resources sufficient for the infrastructure slice to support a pre-defined number of concurrent users of the software offering;
automatically provisioning a plurality of infrastructure slices each having the determined configuration without requiring manual configuration of resources by a user in order to satisfy the availability requirement, the disaster recovery requirement, and the capacity requirement, wherein each infrastructure slice comprises one or more self-contained resources and do not share network traffic with other infrastructure slices from the one-or-more infrastructure slices in order to host an instance of the software offering independently from other instances of the software offering;

automatically re-provisioning the one-or-more infrastructure slices based on changes to the set of requirements specified by the service definition or changes to the resource definition associated with one of the cloud computing service platforms without the assistance of the user;

wherein the one-or-more infrastructure slices comprises a set of active slices that are used for processing workloads and at least one passive slice that is redundantly provisioned to the software offering, wherein the set of active slices comprises resources from at least two different data centers, wherein the at least one passive slice comprises resources from a third data center that is separate from the at least two different data centers, wherein the passive slice is oversubscribed to at least two of the active slices so that the passive slice provides redundancy for all slices in the at least two of the active slices, and wherein the at least two of the active slices comprises slices from two or more of the at least two different data centers.

16. The computer-readable storage medium of claim 15, wherein automatically provisioning plurality of infrastructure slices involves:

provisioning the at least a first infrastructure slice based on the location specified in the resource definition of one of the cloud computing service platforms to satisfy the disaster-recovery requirement.

17. The computer-readable storage medium of claim 15, wherein automatically provisioning the plurality of infrastructure slices involves:

provisioning a subset of the plurality of infrastructure slices as redundant infrastructure slices to satisfy the availability requirement.

18. The computer-readable storage medium of claim 15, wherein each of the infrastructure slices is associated with at least one of:

a load balancer;

a software-development-lifecycle stage of the software offering;

an operational mode; and a physical location.

19. The method of claim 1, wherein the set of requirements specifies an expected availability of the software offering.

* * * * *